United States Patent [19]

Rowland-Hill

[11] 4,177,820
[45] Dec. 11, 1979

[54] COMBINE WITH OFFSET ROTOR
[75] Inventor: Edward W. Rowland-Hill, Lancaster, Pa.
[73] Assignee: Sperry Rand Corporation, New Holland, Pa.
[21] Appl. No.: 894,323
[22] Filed: Apr. 7, 1978
[51] Int. Cl.² .............................................. A01F 12/20
[52] U.S. Cl. .................................................... 130/27 T
[58] Field of Search ............ 130/27 R, 27 T, 27 HA, 130/27 J–27 L; 56/14.6

[56] References Cited

U.S. PATENT DOCUMENTS

| | | | |
|---|---|---|---|
| 3,228,176 | 1/1966 | Stout et al. | 56/16.5 |
| 3,995,645 | 12/1976 | Rowland-Hall | 130/27 T |

FOREIGN PATENT DOCUMENTS

UM1379  1/1974  Philippines ............ 130/27 T

*Primary Examiner*—Russell R. Kinsey
*Attorney, Agent, or Firm*—C. Hercus Just; Frank A. Seemar; John B. Mitchell

[57] ABSTRACT

A combine having a single rotor extending longitudinally for axial feed and discharge having a concave directly beneath the rotor and a separation grate along one side of the rotor adjacent the peripheral path thereof for discharge into a space at one side of the threshing compartment which is formed by laterally offsetting the axis of the rotor from the central axis of the compartment, and a deflector directs the material from said space substantially centrally onto a grain receiving member below the concave and extending between opposite sides of the threshing compartment to prevent overloading of one side of said compartment as in conventional single axial rotor type combines.

4 Claims, 4 Drawing Figures

4,177,820

COMBINE WITH OFFSET ROTOR

BACKGROUND OF THE INVENTION

In recent years, the harvesting industry has developed combines in which rotors and cooperating concaves have been disposed axially within the threshing compartment of the combine for purposes of receiving at the forward end material to be threshed and discharge the separated waste material, such as chaff, straw, vines, and the like at the rear end of the combine. Certain of these combines have had only a single rotor and concave, and others have had multiple rotors and corresponding concaves for each rotor. At present, however, there appears to be a need for a relatively simple combine having a single rotor but, normally, it has been found that if a single rotor is employed in association with a concave in the threshing compartment, there is a tendency for the threshed material to discharge through the concave in a manner to dispose the majority of the material adjacent one side of the means which receives the material for further processing, such as separating the desired material from chaff and the like. This is undesirable because of placing an excess burden upon the subsequent cleaning and separating means associated with the means to receive the threshed material and thereby decreases the efficiency of the combine.

In accordance with the principles of the present invention, it has been found that if the rotor and associated concave are disposed in an offset position to one side of the central axis of the threshing compartment, a marked improvement in the distribution of the discharge of the threshold material has been found, especially by employing appropriate deflecting means described in detail hereinafter. Such an arrangement discharges the threshed material onto the receiving means in a substantially even manner but not necessarily even in depth since there is a tendency for the material to be somewhat mounded along the longitudinal center line of the receiving means, but, nevertheless, represents a great increase in efficiency of a combine of this type.

The only prior art which has been found thus far to disclose an offset rotor for any purpose is found in the following patents: U.S. Pat. No. 3,228,176 to Stout et al., shows a conical threshing rotor which is mounted somewhat offset from the center of the threshing mechanism when viewed in plan, but a divided grain receiver is employed and no purpose is recited for what appears to be at least a slight offset of the rotor in plan view. In addition, the axis of the rotor extends downwardly at an angle as distinguished from being substantially horizontal.

Philippine Pat. No. UM 1379 shows a threshing rotor which is offset from the central axis of the frame which supports it, but without explanation for the purpose of such arrangement, and the means to receive the threshold grain has an auger which carries the threshed product toward the rear where it is sifted by a rotating screen. Neither is the combine of the axial flow type, since the material to be threshed is introduced through one side of the threshing compartment which would tend to indicate that the combine is not of the mobile type in the same sense as conventional mobile combines.

SUMMARY OF THE INVENTION

It is the principal object of the present invention to provide a mobile combine which moves along a field to be harvested and has a threshing compartment which receives material at the forward end and discharges waste material from the rear end, the threshing compartment containing a single rotor of conventional type which is mounted for rotation around an axis offset laterally a desired distance from the longitudinal central axis of the threshing compartment and combine, a concave being positioned circumferentially around the lower portion of the peripheral path of the rotor and the offset position of the rotor and combine providing a space adjacent one side of the rotor and concave into which threshed material is discharged for engagement by a deflector which effects a distribution of the threshed material onto transverse receiving means extending between opposite sides of the threshing compartment in a manner which is substantially even at opposite sides of said receiving means, although the material is possibly slightly mounded along the center axis of said means, thereby providing efficient operation of the combine which employs only a single rotor and concave.

Another object of the invention is to dispose the rotor and concave in a manner that one side thereof is immediately adjacent a sidewall of the threshing compartment, while the opposite sidewall of said compartment is spaced a substantial distance from the other side of the rotor and concave to provide said aforementioned space which receives threshed material for the purpose stated hereinabove, whereby the operation of the aforementioned deflector is further implemented relative to distributing the threshed material on the receiving means by some of the material which is discharged through the side portion of the concave adjacent the first-mentioned wall of the threshing compartment is deflected off of said wall back onto the receiving means and thereby assists in arranging the discharged material in a substantially even manner with respect to opposite sides of the receiving means.

A further object of the invention is to support the aforementioned deflector which is mounted within said material receiving space so as to be pivotally supported by the adjacent sidewall of the threshing compartment, the deflector extending downward and inward from the pivoted upper edge thereof, and positioning means are connected to the lower portion of said deflector and extend through the adjacent sidewall of the threshing compartment for adjustable positioning of the support member with respect to said sidewall and correspondingly vary the angularity of the deflector as required for purposes of effecting the desired distribution of material upon the receiving means.

Details of the foregoing objects and of the invention, as well as other objects thereof, are set forth in the following specification and illustrated in the accompanying drawings comprising a part thereof.

DETAILED DESCRIPTION

Figure 1:
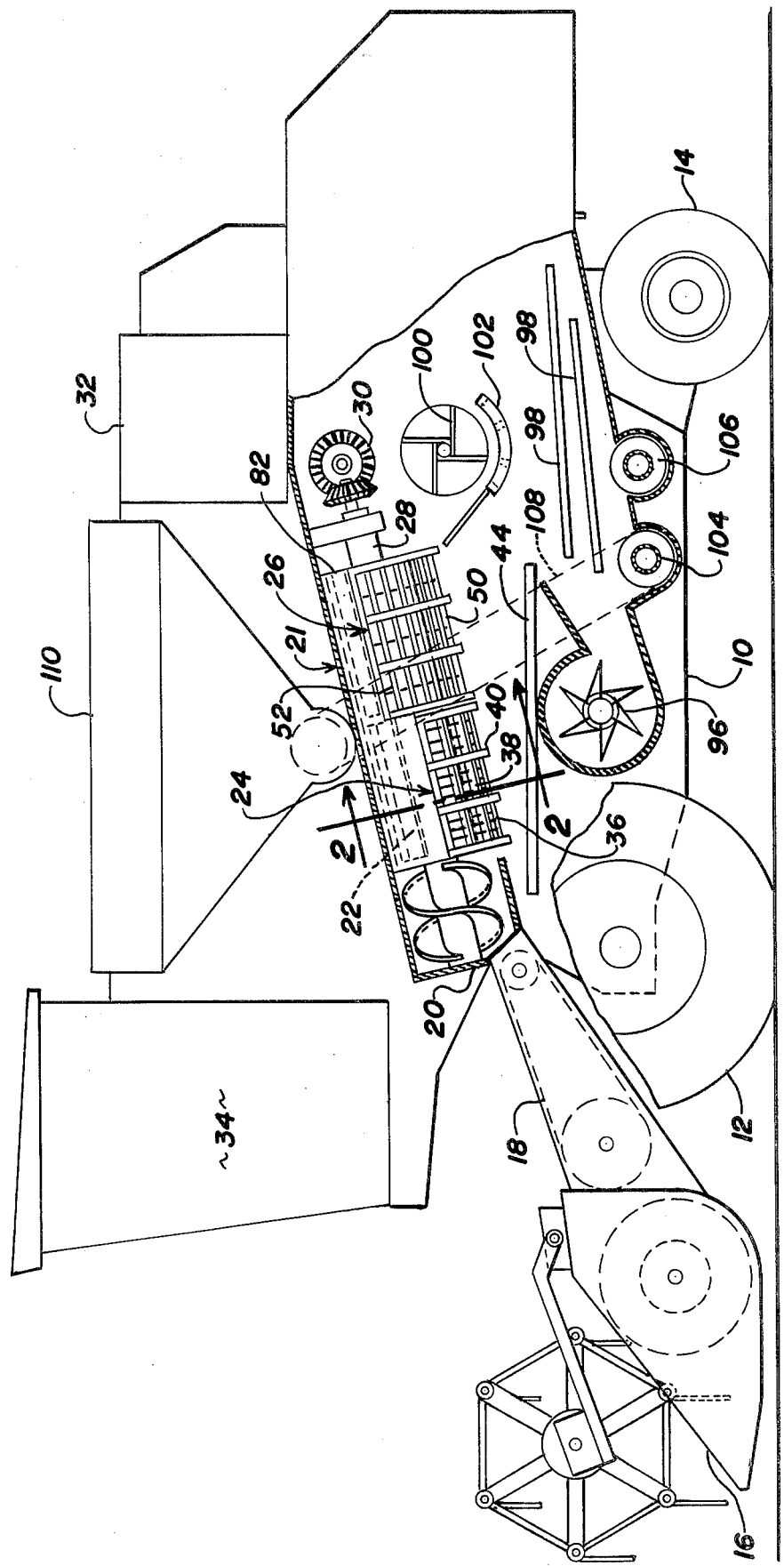
FIG. 1 is a side elevation of a mobile type combine embodying the principles of the present invention, part of the figure being sectioned vertically to disclose details of the interior portions of the combine associated especially with the invention.

Referring to FIG. 1, the mobile combine shown therein comprises a frame 10 supported by front drive wheels 12 and rearward steering wheels 14. Conventional header means 16 are supported to project forwardly from the front end of the combine for purposes of cutting and consolidating material to be threshed for elevation by the elevator means 18, upwardly to the inlet end 20 of the threshing compartment 21. From this view, it will be seen that the theshing compartment is of the axial flow type and includes a single rotor 22, which, as viewed from FIG. 1, includes a threshing portion 24 and a coaxial separating portion 26, both of which are mounted upon a common axis 28, driven by bevel gears 30 which are powered by means of a conventional diesel engine 32 or the like.

Figure 2:
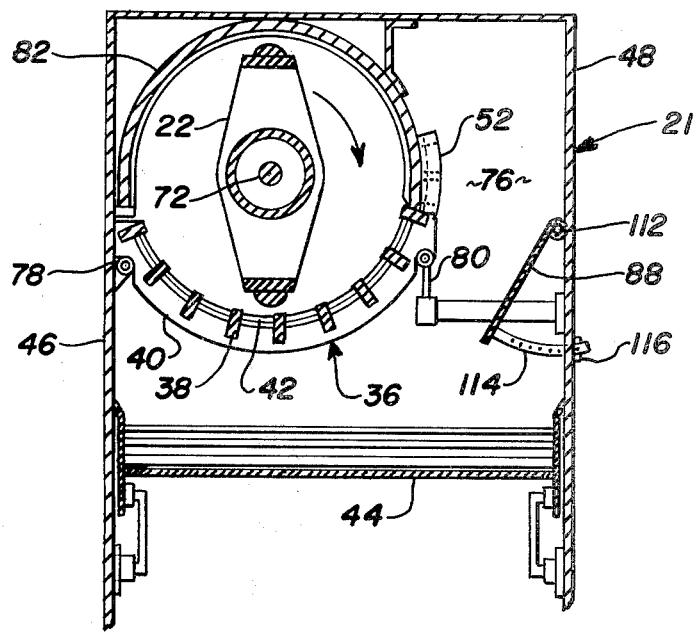
FIG. 2 is a vertical sectional elevation of the threshing compartment of the combine shown in FIG. 1, as seen on the sectional line 2—2 thereof.

The combine is operated from a cab 34 in which the driver is seated. Associated with the single rotor 22, which includes the threshing and separating portions 24 and 26, is a conventional concave 36 which is arcuate as seen in FIG. 2, and extends around the peripheral path of the rotor 22, said concave being of the conventional type employing longitudinal bars 38 and supporting arcuate members 40, as well as arcuate wires 42, which afford a mesh type structure through which threshed material passes and falls by gravity upon product receiving means 44, which is of conventional type, and extends between opposite sides 46 and 48 of the threshing compartment 21. The concave 36 is associated with the threshing portion 24 of the single rotor 22 and, correspondingly, another concave 50 is coaxial with and extends rearwardly from the concave 36 for coaction with the separating portion 26 of the single rotor 22. The concave 50 also extends upwardly along the side of the peripheral path of the rotor 22 a greater distance than the corresponding side of the concave 36 for purposes of providing a separation grate 52, best shown in FIG. 1.

Figure 3:
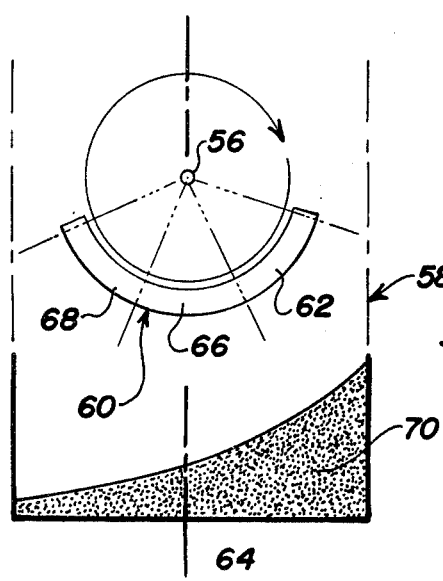
FIG. 3 is a vertical sectional diagram of the operation of the threshing compartment of a single rotor combine in which the rotor axis is coaxial with the longitudinal center of the threshing compartment and illustrating in exemplary manner the resulting disposition of threshed material upon the receiving means of such combine.

Referring to FIG. 3, there is illustrated somewhat diagrammatically therein, a combine in which the central axis 56 of a rotor is disposed in coincidence with the central longitudinal axis of the exemplary threshing compartment 58. A concave 60 extends circumferentially around the lower portion of the path of movement of the rotor 56 and subtends an arc, which is somewhat greater than one-third the circumference of the peripheral path of the rotor. In operation of a single rotor combine of this type, under normal crop conditions, it has been found that nearly half of the grain or other crop material which is threshed by said rotor and concave, discharges through the segment 62 onto the receiving means 64, about one-third of the material discharges through segment 66, and less than one-fourth of the material is discharged through the segment 68. This results in a very uneven distribution of the material 70 upon the receiving means 64 and results in great inefficiency in the sifting and other separating mechanism which treats the initially threshed material in other locations in the combine.

Figure 4:
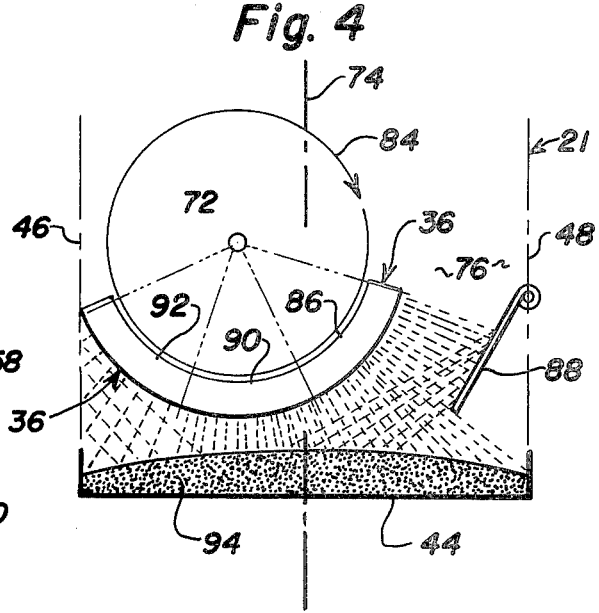
FIG. 4 is a vertical sectional view similar to FIG. 3 but showing the resulting deposit of the threshed material upon the receiving means in accordance with the principles of the present invention and also showing by suitable directional lines the exemplary discharge of material onto the receiving means.

The foregoing difficulty has been found to be eliminated by the relatively simple expedient of mounting the rotor 22 with its axis 72, as shown in FIGS. 2 and 4, in an offset manner with respect to the longitudinal central axis 74 of the threshing compartment 21, as seen in FIG. 4. Correspondingly, the concave 36 is mounted directly below the peripheral path of the extremities of the rotor 22, seen in FIG. 2, the concave 36 extending circumferentially to an extent greater than one-third of the circumference of said path of the rotor, and by mounting said concave and rotor so that the left-hand side thereof, as viewed in FIG. 2, is adjacent the sidewall 46 of the threshing compartment 21, a space 76 is provided between, for example, the right-hand edge of concave 36 and separation grate 52, and the sidewall 48 of the threshing compartment 21. The opposite edges of the concave are appropriately supported by any suitable means such as brackets 78 and 80, which are exemplary. Further, in accordance with conventional construction, the threshing compartment includes an arcuate shield 82, which extends around the upper portion of the peripheral path of the opposite bars of the rotor 22, the lower edges thereof suitably being positioned adjacent the opposite edges of the concave 36 and additional concave 50, as seen in FIG. 1.

Referring to the diagrammatic illustration in FIG. 4, the axis 72 of the rotor 22 is driven in the direction of the arrow 84. Under normal crop conditions, this results in the majority of the material, usually nearly half, being discharged through the segment 86 and a substantial portion thereof engages the angular deflector 88 and is deflected toward the center of the product receiving means 44; and under the same conditions, about one-third of the material is discharged through segment 90 of the concave 36 and less than one-fourth of the material is discharged through segment 92 of concave 36. Part of the material discharging through segment 92 engages sidewall 46 of the threshing compartment 21 and is deflected backward toward the central part of receiving means 44 as shown by the inward and downwardly extending broken directional lines shown in FIG. 4. The resulting deposit of the material 94 upon receiving means 44 therefor is far more even than the result illustrated in FIG. 3, where the rotor and concave are mounted centrally of the threshing compartment. At least, the deposit of the material 94, as shown in FIG. 4, is approximately even from side to side even though there is a limited mounding of the material shown by the stippling in FIG. 4, such disposition, however, being much more readily and efficiently handled by the subsequent cleaning and separating means of a conventional nature, such as shown in similar exemplary manner in FIG. 1, including a blower 96, sifting screens 98, and a beater 100 and beater grate 102, which further threshes the tailings in an effort to achieve maximum salvage of the threshed grain. The product from which waste material, such as chaff, straw or vines, have been removed is engaged by augers 104 and 106 and elevating means 108 for discharge into the product hopper 110, which is capable of receiving a substantial quantity thereof.

In accordance with the condition of the material to be threshed on certain days, in which humidity and other weather conditions vary, as well as incident to harvesting crops of different kinds which are to be threshed, the angular deflector 88 may be variably positioned by pivotally connecting the upper end 112 thereof to the sidewall 48 and the lower portion of the deflector has an arcuate supporting member 114, which is connected at one end to the deflector 88 and the opposite end extends through a suitable hole, for example, in the sidewall 48 of threshing compartment 21 for purposes of receiving a suitable latching member or the like 116 which adjustably positions the angle of the deflector 88 at the position in which the deflected material will be deposited in the most even manner in accordance with the particular crop, as well as the physical condition thereof. Preferably, the securing mechanism such as latching means 116 is of a type that can be readily manipulated from the exterior of the threshing compartment 21.

In setting forth exemplary proportions of the crop material which is discharged through the various segments of the concave as described above, it is to be understood that the proportions and percentages are exemplary and may vary from the specific recitations but, nevertheless, are suitable to illustrate the effectiveness of the present invention to achieve a highly desirable spreading of the threshed material upon the receiving means 44 to render the subsequent operations upon said material relatively efficient as compared with the results shown in exemplary manner in FIG. 3, where the rotor and concave are substantially central of the threshing compartment.

It is contemplated that certain operational environmental conditions, such as those encountered in hilly regions, will necessitate, or at least encourage, the use of an additional deflector. More specifically, under hillside conditions, the advantageous even distribution of material resulting from use of the instant invention will be enhanced by employing a second deflector (refer to FIG. 2) similar to 88, on side 46 below bracket 78. This second deflector should also be positionally adjustable to meet varying operating conditions.

From the foregoing, it will be seen that the present invention is capable of providing a highly efficient combine, having only a single rotor and which combine lends itself particularly to be constructed in smaller sizes than conventional combines intended for heavier duty and, by mounting the rotor and concave in an offset manner, the deposit of the threshed material upon the receiving means is such that subsequent handling of the material is accomplished with maximum efficiency and minimum power requirements, together with minimizing wear upon the components of the combine and freedom from damage thereto.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A combine for cutting and threshing agricultural products comprising in combination, a mobile frame, a threshing compartment extending longitudinally upon said frame and having an inlet at one end to receive products to be threshed and discharge means at the other end through which waste material is discharged, a single threshing rotor extending longitudinally within said threshing compartment and rotatably supported by axially aligned bearings offset laterally a predetermined distance from the central axis of said compartment to provide a side space laterally between the peripheral path of said rotor and one side of said compartment, a concave supported by said frame longitudinally beneath said rotor and extending segmentally adjacent the lower portion of the peripheral path of said rotor, a separation grate extending coaxially beyond the inner end of said concave and having an upper portion extending upwardly above the corresponding edge of said concave on the side adjacent said space, means extending transversely between the opposite sides of said threshing compartment below said concave to receive threshed material, means to rotate said rotor in a direction to direct the threshed product toward and into said side space in said compartment, a deflector supported at said one side of said compartment and extending downward and inward from one edge adjacent said one side of said compartment and operable to deflect threshed material discharged through said separation grate and concave into said space downward and inward toward the longitudinal center of said material receiving means, and means adjustably supporting the lower edge of said deflector at desired distances toward and from said one side of said compartment to vary the inclination of said deflector to effect substantially evenly desired distribution of said material across said receiving means, whereby substantially even distribution of threshed material occurs on said receiving means between opposite sides thereof.

2. The combine according to claim 1 in which the opposite side of said compartment is adjacent the peripheral path of said rotor and the edge of said concave opposite the edge nearest said space, the segment of said concave nearest said opposite side of said compartment being positioned and arranged to discharge less material than the central segment of said concave and the central segment also being positioned and arranged to discharge less than the segment nearest said space, and some of the material discharged through said segment nearest said opposite side of said compartment being deflected by engagement with said opposite side of said compartment inwardly toward the center of said receiving means, thereby to facilitate the distribution of said material across material receiving means.

3. The combine according to claim 1 in which said deflector extends longitudinally along said compartment substantially for the full length of said concave and separator grate.

4. The combine according to claim 1 in which said means adjustably supporting said lower edge of said deflector comprises arcuate arm means connected at one end to said deflector and the opposite end extending through said one wall of said compartment for adjustable connection therewith.

* * * * *